No. 816,190.  
PATENTED MAR. 27, 1906.  
J. SIEGER.  
STUFFING BOX.  
APPLICATION FILED MAR. 28, 1905.

Witnesses.  
Georg Paul  
Paul Zühlke

Inventor:  
Josef Sieger  
by E. Witte  
Attorney.

UNITED STATES PATENT OFFICE.

JOSEF SIEGER, OF HÖRDE, GERMANY.

STUFFING-BOX.

No. 816,190.　　　Specification of Letters Patent.　　　Patented March 27, 1906.

Application filed March 28, 1905. Serial No. 252,531.

*To all whom it may concern:*

Be it known that I, JOSEF SIEGER, a subject of the German Emperor, residing at Hörde, Westphalia, in the Kingdom of Prussia, Germany, have invented certain new and useful Improvements in Stuffing-Boxes, of which the following is a specification.

For a certain class of stuffing-boxes, especially for those admitting of motion in all directions, elasticity has hitherto been produced exclusively by means of spiral springs or spring-plates, which, however, when exposed to high temperatures—such as occur, for instance, in superheated steam and gas engines—readily lose their flexibility through the constant influence of the hot gas, and thus often cause breakdowns. Furthermore, the refitting of such springs is difficult, requiring much time, and the construction is generally complicated and expensive. According to my invention all these drawbacks are effectually overcome in the simplest possible manner and a stuffing-box provided which insures ample elasticity of the packing in the longitudinal direction of the rod without the degree of resilience being liable to be affected by external influences.

The invention is illustrated in the accompanying drawings, in which—

Figure 1:
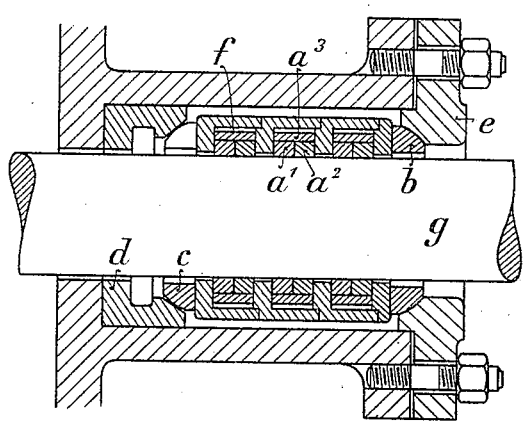
Figures 2, 3, 4:
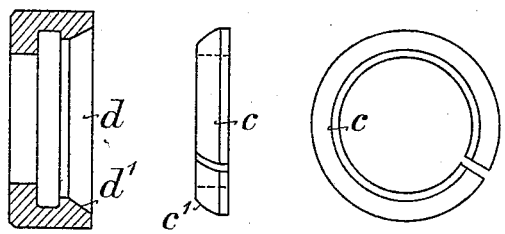

Figure 1 is a longitudinal section through the stuffing-box. Fig. 2 is a detail view showing the split ring employed. Fig. 3 is an edge view of this ring. Fig. 4 is a section through the bush into which the split ring fits.

As will be seen from Fig. 1, a packing of any kind may be taken, the one represented consisting of pairs of metal rings $a'$ $a^2$, elastically expanded by the rod $g$ and arranged in annular chambers $f$. This packing is located between a movable collar or ring $b$, having a spherical surface and fitting into the gland $e$, and a split ring $c$, which is a loose fit on the rod $g$ and presents a conical surface $c'$, thus constituting a kind of ball-and-socket joint with the bush $d$, which has a conical seating $d'$ to receive it. The bush $d$ may naturally be dispensed with and the conical surface provided on the box itself. The ring $c$ by reason of its resilience exercises elastic pressure at right angles to the axis of the rod, and in conjunction with the bush $d$, in view of the conical surfaces of contact $c'$ $d'$, it also exerts elastic pressure in the direction of the rod-axis, whereby the packing is pressed tightly together. In order that the ring $c$, despite variation in its diameter owing to alteration of the longitudinal pressure, may always coöperate with the bush $d$ when required in the manner of a ball-and-socket joint, the members $c$ $d$ are so formed that universal rotary motion between them can take place in every position and that the inclination of various spherical elements of the two contact-surfaces of the annular members to the axis of the ring is such that the conditions of resilience attained are those most favorable to the purpose in view. The two supporting-surfaces can thus be produced by rotation of a curve or of a straight line and appropriately combined. In the construction shown in the drawings the ring $c$ presents a spherical zone of relatively small radius and the bush $d$ a zone of larger radius. The departure from the theoretically correct spherical surfaces is not objectionable in practice, since the resilience of the ring $c$ and the elasticity of the material admit of intimate contact between the two surfaces $c'$ $d'$ in every position of rotation, the more so since such rotation only occurs within strict limits.

Any suitable packing may be employed. That shown is ground steam-tight into special annular chambers $f$ and consists of pairs of split rings $a'$ $a^2$ the joints of which are covered by a tightly-fitting spring-ring $a^3$. The packing is so located between the rings $b$ and $c$ that it can readily accommodate itself to any deviations of the piston-rod from the center line of the cylinder. In this manner and in view of the above-described ball-and-socket-joint arrangement the inner surface of the packing will always make close contact with the rod even on bending of the latter, so that a thoroughly-steam-tight joint is insured.

The self-acting ring $c$ can also be advantageously employed even in cases in which motion of the packing in all directions is not a requirement, but merely elasticity in the longitudinal direction of the rod, such as in the case of vertical piston-rods. In any event it overcomes the effect of any expansion due to heat and maintains the packing under pressure even during the return stroke of the piston or when there is a vacuum in the cylinder.

Having thus described my invention, I claim as new and desire to secure by Letters Patent—

1. In combination, a stuffing-box, and a resilient split ring loosely fitting the packed rod and adapted to bear against the packing, said box and ring presenting such conical mutually-contacting surfaces as enable the ring to slide in the box in axial direction, substantially as described.

2. In combination, a stuffing-box, an annular bush at the inner end thereof, and a resilient split ring loosely fitting the packed rod and adapted to bear against the packing, said bush and ring presenting such conical mutually-contacting surfaces as enable the ring to slide in the box in axial direction, substantially as described.

3. In combination, a stuffing-box, a loose collar at the gland end and an annular bush at the cylinder end thereof, and a resilient split ring loosely fitting the packed rod and adapted to bear against the packing, said bush and ring presenting such conical contacting surfaces as enable the ring to slide in the box in axial direction, substantially as described.

In testimony whereof I have hereunto signed my name in the presence of two subscribing witnesses.

JOSEF SIEGER.

Witnesses:
OTTO KÖNIG,
WALTER SIBLEY.